United States Patent [19]
Maynard

[11] 3,808,021
[45] Apr. 30, 1974

[54] METHOD OF RAPID DIFFERENTIAL FLOCCULATION OF KAOLIN SLURRIES

[75] Inventor: Robert Nelson Maynard, Cochran, Ga.

[73] Assignee: J. M. Huber Corporation, Locust, N.J.

[22] Filed: June 8, 1972

[21] Appl. No.: 263,377

[52] U.S. Cl. ............... 106/288 B, 106/72, 423/118
[51] Int. Cl. ............................................. C09c 1/42
[58] Field of Search ............ 106/288 B, 72; 209/5; 423/118

[56] References Cited
UNITED STATES PATENTS

| | | | |
|---|---|---|---|
| 3,539,003 | 11/1970 | Bidwell | 106/288 B |
| 3,594,203 | 7/1971 | Sawyer et al. | 106/288 B |
| 3,701,417 | 10/1972 | Mercade | 106/288 B |
| 2,900,266 | 8/1959 | Shaver | 106/288 B |
| 3,171,718 | 3/1965 | Gunn et al. | 106/72 |
| 3,371,988 | 3/1968 | Maynard et al. | 106/72 |
| 2,920,832 | 1/1960 | Duke | 423/118 |
| 3,615,806 | 10/1971 | Torok | 106/288 B |

Primary Examiner—Delbert E. Gantz
Assistant Examiner—James W. Hellwege
Attorney, Agent, or Firm—Harold H. Flanders; Donald S. Lilley

[57] ABSTRACT

Treatment of reflocculated kaolin slurries with anionic, high molecular weight polymer flocs and settles a purified kaolin clay leaving titanium and iron contaminants in suspension.

3 Claims, 1 Drawing Figure

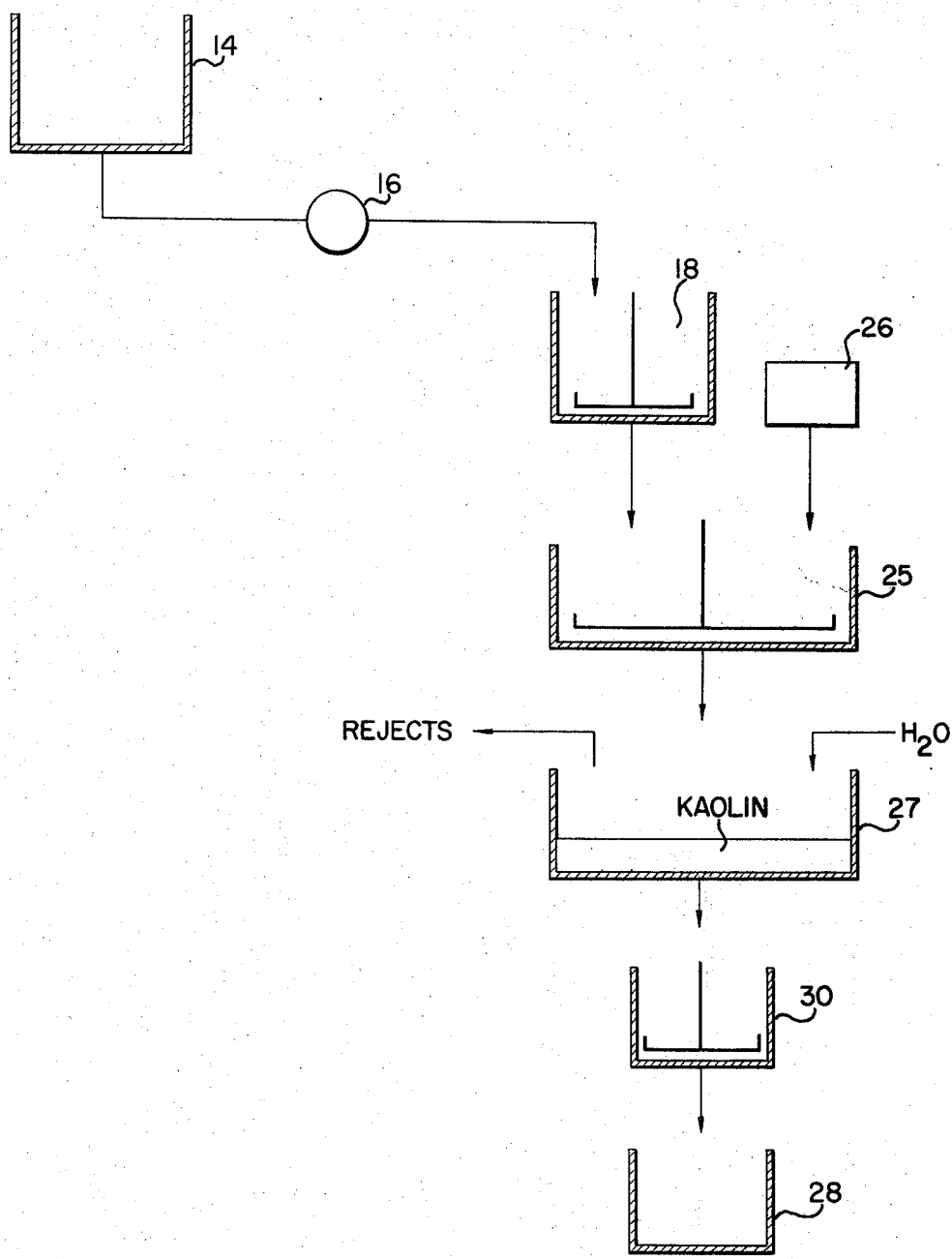

METHOD OF RAPID DIFFERENTIAL FLOCCULATION OF KAOLIN SLURRIES

BACKGROUND OF THE INVENTION

In general, the present invention relates to the beneficiation of clays and more particularly to the differential flocculation of kaolin slurries.

Natural occurring clays vary considerably in their color properties, even when produced from mines in the same locality or even from different sites in the same mine. Natural occurring kaolin clay deposits contain discoloring contaminants, for example, iron and titanium minerals. Titanium minerals in kaolin usually occur as discolored particles and these are largely responsible for the yellow-brown shade of many kaolins. Often a clay is rejected as being unsuitable for commercial use solely on the basis of color even though its other physical properties such as the viscosity of clay-water slurries and particle size distribution are within desired limits.

The brightness of clays usually is increased by fractionation, the finer the particle size the brighter the clays; however, this increase is insufficient for the more discolored clays in order to be acceptable commercially and additional treatment is required of the refined clays such as chemical bleaching. Bleaching with chemicals such as zinc or sodium hydrosulphite generally results in improved brightness of the refined clay slurries, but this is usually an increase of only 2 to 5 brightness points. There are other methods of improving the brightness of clays but generally they are quite expensive and do not give a sufficient increase in brightness to justify the expense.

An important step forward in the solution of the brightness problem was made by Maynard, et al., as disclosed in U.S. Pat. No. 3,371,988.

This process while yielding a high brightness product requires relatively long sedimentation periods proceeding a sedimentation rate on the order of 70 to 100 minutes per inch of slurry depth. Attempts to utilize centrifuges in order to accelerate the sedimentation rate have thus far failed to produce acceptable yields.

SUMMARY OF THE INVENTION

Accordingly, it is an object of this invention to provide a new, highly effective method of removing discoloring $TiO_2$ contaminants and of overcoming the deficiencies of the prior art approaches.

Other objects and a fuller understanding of the invention may be had by referring to the following description and claims taken in conjunction with the accompanying drawings.

The present invention overcomes the deficiencies of the prior art and achieves its objectives by the treatment of a reflocculated kaolin slurry with an anionic, high molecular weight polymer. This process flocculates and settles a purified kaolin clay at an extremely rapid sedimentation rate of 2 to 10 minutes per inch of slurry depth, leaving the titanium and iron contaminants in suspension.

BRIEF DESCRIPTION OF THE DRAWINGS

In order to facilitate the understanding of this invention, reference will now be made to the appended drawings of preferred embodiments of the present invention. The drawings should not be construed as limiting the invention but are exemplary only.
In the drawings:
FIG. 1 represents schematically a typical process flow diagram.

DESCRIPTION OF THE PREFERRED EMBODIMENTS

I. General Procedure

As illustrative of a general and typical procedure of a preferred embodiment of the present invention consider the following process as shown in FIG. 1 of treatment of an unleached 30 percent solids kaolin clay slurry obtained from normal plant production of a coating grade fraction.

A. Reflocculation

The slurry may then be metered from storage tank 14 through metering pump 16 to Cowles dissolver 18 or similar high shear mixing tank.

In treatment tank 18, 20 pounds per ton of clay of TSPP is added and mixed.

B. Polymer Treatment

The slurry is treated in mixing tank 25 with a strongly anionic, high molecular weight polymer from polymer makedown tank 26 in a dosage of one pound per ton of dry clay. The polymer is in general maded down in 26 as a 0.02 to 0.1 percent aqueous solution prior to addition to the slurry.

C. Mixing During and After Addition of the Polymer

Agitation must be provided sufficient to incorporate the polymer solution rapidly into the clay slurry. A refined kaolin-polymer floc forms immediately upon incorporation of the polymer.

D. Sedimentation of Kaolin-Polymer Flocs

Sedimentation of the kaolin-polymer flocs is rapidly accomplished in settling tank 27. These flocs, upon standing, settle out of suspension with sedimentation rates varying from 2 to 10 minutes per inch of slurry depth used. Withdrawal of the titanium impurities remaining in suspension may be initiated by siphoning or other methods. The kaolin flocs are washed to remove entrapped titanium impurities and then subjected to high shear in mixer 30 to provide a free flowing slurry.

E. Processing the Refined Slurry

The refined clays may be stored in tank 28 and later processed by washing, leaching, filtering, and drying as is well known in the art.

For example, this beneficiated clay may be acidified with sulfuric acid to a 6.0 slurry pH and coagulated with aluminum sulfate to a 4.3 slurry pH and filtered to remove excess soluble salts.

The resulting filter cake may be diluted with water and re-slurried at about 20 percent clay solids.

After washing, the clay may be leached with 8 pounds of zinc dithionite per ton of clay at 60° C for 30 minutes with mild agitation. After leaching, the clay may be filtered and the filter cake dried to about 1 percent moisture content.

After treatment, each clay may be evaluated as to brightness and contents of titanium and iron impurities.

II. EXAMPLES

EXAMPLE 1

As a control for the next example, a sample of unleached slurry, containing 31.7 percent solids, was obtained from normal plant production of a No. 3 coating grade clay consisting of about 72 percent finer than 2 micron diameter (E. S. D.) particles. The clay of this slurry had a brightness of 83.4 and contained 1.65 percent, by weight, of titanium impurities expressed as $TiO_2$ and 0.36 percent, by weight, of iron impurities expressed as $Fe_2O_3$. Conventional leaching with 10 pounds of zinc hydrosulfite per ton of clay and 6 pounds of alum per ton of clay gave a brightness of 86.7.

EXAMPLE 2

The starting slurry of Example 1 was reflocculated by treating with 20 pounds of dispersant, tetrasodium pyrophosphate (TSPP), per ton of clay, while mixing with a Cowles Dissolver for 30 minutes. This clay slurry, having a pH of 8.85, was aged with mild agitation for 20 hours. After aging, the slurry was treated with a polymer, Nalco 635, identified as a water soluble, high molecular weight polyacrylamide, being strongly anionic in nature. Prior to use, the polymer was dissolved in water at a concentration of 0.1 percent. An amount of the polymer solution equivalent to one pound of polymer, dry basis, per ton of clay was used. A Lightnin Mixer was used with a mixing speed just sufficient to distribute the polymer solution through the clay slurry.

Selective flocculation of a beneficiated kaolin clay fraction in the form of large, white flocs, was observed to occur immediately after addition of the polymer solution to the slurry. Upon standing, the large flocs of clay rapidly settled leaving a dark yellow, dispersed fraction in suspension.

After sedimentation of the white clay flocs, the remaining discolored suspension was withdrawn by siphon, followed by washing of the clay flocs with water. The clay flocs were then subjected to high shear mixing to provide free-flowing slurry.

The refined clay, consisting of 69.7 percent finer than two micron diameter (E. S. D.) particles and amounting to 70.4 percent of the original material, had a brightness of 87.8 and a decreased impurities content of 0.51 percent titanium expressed as $TiO_2$ and 0.32 percent iron expressed as $Fe_2O_3$. After leaching, the refined clay had a brightness of 89.3.

In further experiments following the procedure of the above example and varying the polymer dosage over the range fom one-half pound to 1.5 pounds per ton (dry basis) of clay it was observed that the clay brightness produced varied from 88.5 to 90.5.

EXAMPLE 3

As a control for the next example a sample of unleached slurry, containing 30.3 percent solids, was obtained from normal plant production. This clay was previously refined from crudes obtained from Central Georgia deposits by dispersion and classification to a No. 2 coating grade fraction consisting of about 82 percent finer than 2 microns diameter (E. S. D.) particles. The clay of this slurry, containing 1.61 percent, by weight, of titanium impurities expressed as $TiO_2$ and 0.4 percent, by weight, of iron impurities expressed as $Fe_2O_3$, had a brightness of 84.8. Conventional leaching with 8 pounds of zinc hydrosulfite per ton of clay and 6 pounds of alum per ton of clay gave a brightness of 87.2.

EXAMPLE 4

The starting slurry of Example 3 was treated by mixing with a Cowles Dissolver for 30 minutes at 30.3 percent solids with a dispersant, tetrasodium pyrophosphate (TSPP) amounting to 20 pounds per ton of clay. This reflocculated slurry, having a pH of 8.85, was diluted with water to 20 percent solids and additionally treated by mixing with a polymer, Nalco 635, previously dissolved in water at a concentration of 0.1 percent, and in the amount of one pound, dry basis, per ton of clay.

Selective flocculation of a kaolin clay fraction, in the form of large, white flocs, was observed immediately upon addition of the polymer solution. The flocs of kaolin rapidly settled, upon standing, leaving a highly discolored, yellow material remaining in suspension.

The refined clay was recovered by decanting the discolored suspension. The recovered clay, containing 0.39 percent, by weight, of titanium impurities expressed as $TiO_2$ and 0.32 percent, by weight, of iron impurities expressed as $Fe_2O_3$, had a brightness of 88.7. After leaching, this clay had a brightness of 90.0.

The discolored fraction, remaining after recovery of the white clay fraction, had a brightness of 80.6 and contained 3.45 percent, by weight, of titanium impurities expressed as $TiO_2$ and 0.41 percent, by weight, of iron impurities expressed as $Fe_2O_3$.

EXAMPLE 5

As a control for the next example, a sample of unleached slurry, containing 29.67 percent solids, was obtained from plant production of a No. 1 coating grade clay. The clay of this slurry, containing 1.69 percent, by weight, of titanium impurities expressed as $TiO_2$ and 0.34 percent, by weight, of iron impurities expressed as $Fe_2O_3$, has a brightness of 83.8. Conventional leaching of this clay gave a brightness of 87.2.

EXAMPLE 6

The starting slurry of Example 5 was treated by mixing with a Cowles Dissolver for 30 minutes at 29.67 percent solids with a dispersant, tetrasodium pyrophosphate (TSPP), amounting to 20 pounds per ton of clay. This reflocculated slurry, having a pH of 8.58, was additionally treated by mixing with a polymer, Nalco 635, previously dissolved in water at a 0.1 percent concentration and in the amount of one pound, dry basis, per ton of clay. Immediately, selective flocculation of a white kaolin clay fraction was observed as in Examples 2 and 4. The clay flocs were washed free of the discolored suspension by washing with fresh water.

After washing, the refined clay, amounting to 91 percent of the original clay, had a brightness of 87.6 and contained 0.65 percent, by weight, of titanium impurities expressed as $TiO_2$ and 0.33 percent, by weight, of iron impurities expressed as $Fe_2O_3$. After leaching, this clay had a brightness of 90.0.

The discolored fraction, removed from the clay flocs by washing, consisted of 6.35 percent, by weight, of titanium impurities expressed as $TiO_2$ and 0.53 percent, by weight, of iron impurities expressed as $Fe_2O_3$ and had a brightness of 76.2.

EXAMPLE 7

An unleached kaolin clay slurry, containing 20 percent solids, was obtained from plant production of a high brightness, high gloss, high surface area, fine particle size grade of water-washed East Georgia paper coating clay. This clay slurry was refined in accordance with our patented process as revealed in U.S. Pat. No. 3,371,988, and contained 0.83 percent, by weight, of titanium impurities expressed as $TiO_2$ and 1.12 percent, by weight, of iron impurities expressed as $Fe_2O_3$. The clay of this slurry, after leaching, had a brightness of 92.0.

This starting slurry, having a pH of 11.3, was additionally treated by mixing with a polymer, Nalco 635, previously dissolved in water at a 0.1 percent concentration, and in the amount of one pound, dry basis, per ton of clay. Large white flocs of kaolin clay immediately formed upon addition of the polymer. Upon standing, the clay flocs rapidly settled leaving a dispersed, highly discolored, yellow fraction remaining in suspension. The flocs of white clay were recovered by removing the discolored suspension by siphon.

The recovered clay, amounting to 64.3 percent, of the starting material, contained impurities, additionally reduced in content from the starting, refined clay, in the amount of 0.38 percent titanium impurities expressed as $TiO_2$ and 1.09 percent iron impurities expressed as $Fe_2O_3$. After leaching, this clay had a brightness of 93.0.

The discolored fraction removed from the above refined clay contained 1.18 percent of titanium impurities expressed as $TiO_2$ and 1.16 percent of iron impurities expressed as $Fe_2O_3$.

A comparison of the viscosity characteristics of the refined clay and the discolored fraction, in 68 percent clay water dispersion, showed essentially the same properties.

EXAMPLE 8

This example demonstrates the effect of delaminating a fine fraction kaolin, without prior beneficiation to remove $TiO_2$ impurities, and is intended as a control for Example 9.

A sample of dispersed, unleached slurry, containing 30 percent solids, by weight, was obtained from plant production of a No. 1 coating grade clay composed of about 91.1 percent by weight of particles finer than 2 microns (E. S. D.) diameter. The clay contained in this slurry had a brightness of 84.7.

Delamination by grinding to a particle fineness of 95.0 percent, by weight, less than 2 micron (E. S. D.) diameter particles was accomplished by mixing the clay slurry with a quantity of glass beads, 20 to 30 mesh size, sufficient to occupy 55 percent of the total volume of the mixture. Delamination was accomplished by mixing for 13.5 minutes using an impeller peripheral speed of 1,260 fpm.

After delamination, the slurry was separated from the glass beads by screening. Conventional leaching with 8 pounds zinc hydrosulfite per ton of clay and flocculation with 6 pounds alum per ton of clay gave a finished clay brightness of 88.4.

EXAMPLE 9

This example demonstrates the effect of beneficiation in removal of $TiO_2$ impurities by a polymer treatment prior to delamination. The starting slurry of Example 8 was reflocculated by treating with a solution of sodium hydroxide containing 0.2 gram per milliliter solution, in an amount equivalent to 1.5 pounds, dry basis, per ton of clay. Treatment was accomplished by mixing with a Cowles Dissolver for 15 minutes using an impeller peripheral speed of 1,900 fpm.

After reflocculation, the slurry was diluted to 10 percent clay solids and treated with a 0.1 percent solution of a high molecular weight, anionic, polyacrylamide polymer, Nalco 633, in an amount equivalent to 0.5 pounds, dry basis, per ton of clay. Treatment was accomplished by mixing for 2 minutes using an impeller speed of 580 fpm.

Treatment with the polymer resulted in selective flocculation and separation of a beneficiated kaolin clay fraction as previously described in Example 2.

Recovery and washing of the beneficiated clay flocs were accomplished as previously described in the above reference.

The refined clay, consisting of 90.8 percent finer than 2 micron (E. S. D.) diameter particles and amounting to 82 percent of the original material, had a brightness of 87.3. The titanium content, expressed as $TiO_2$ had been reduced by this treatment from 1.54 percent to 0.86 percent. This refined slurry was delaminated by grinding to a particle fineness of 94.8 percent, by weight, less than 2 micron (E. S. D.) diameter particles and leached as described in Example 8 above. This delaminated clay product possessed a brightness of 90.8, a 2.4 points improvement over the control.

The preferred polymers of the present invention are Nalco 635 and 675, a water soluble, strongly anionic, polyacrylamide polymer with a molecular weight in excess of one million, produced by the Nalco Chemical Company, Chicago, Illinois and Betz 1200, 1210, 1220 and 1230, a water soluble, strongly anionic, organic copolymer of acrylamide having a molecular weight in excess of one million, supplied by Betz Laboratories, Inc., Trevose, Pennsylvania. The 1200 through 1230 series of polymers of Betz are rated, progressively, in order of their increasing numerical designations as high, very high and extremely high molecular weight. The extremely high molecular weight (approximately 12 – 13 million) 1230 polymer, consisting of 60 percent acrylics, is preferred in the practice of the present invention.

Polymers of a cationic or neutral character have been found unsuitable for the present invention. Further polymers, including polyacrylamides, with molecular weights less than one million have been found ineffective in the process of the present invention.

Thus, in the practice of the present invention, and as briefly discussed above, suitable polymers employable in the present invention comprise water-soluble strongly anionic products produced by the polymerization of acrylamides or copolymers of acrylamide and other monomers polymerizable therewith such as acrylic acid, methacrylic acid, etc. Such products are known and may be produced by conventional polymerization techniques, e.g., bulk, solution, suspension or emulsion polymerization, etc.

Thus in accordance with the present invention it is preferred to employ a water soluble, anionic polymer having the general structure

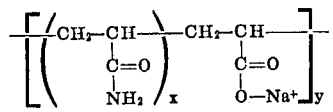

based on a polyacrylamide structure such as

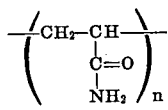

It has been discovered that the nature of the polymer is critical to the extent that the polyelectroyte must have an anionic character and a high molecular weight. In this regard, particularly advantageous results are obtained in the present invention when the polymer has a high molecular weight, i.e., in excess of one million.

The dispersant used for reflocculating the slurry prior to the polymer treatment appears to be limited to either TSPP (tetrasodium phrophosphate) or STPP (sodium tripolyphosphate), or those dispersants with sodium hydroxide.

The reflocculated slurry, prior to polymer treatment, may possess a pH anywhere between 7.5 up to about 12.0.

The process of the present invention will not work when neutral salts or other materials, such as alum, sulfuric acid, sodium carbonate or NaCl are used in combination with TSPP or STPP.

The effect of repeated washing of the kaolin-polymer flocs on the content of $TiO_2$ retained in the finished clay, the yield or percentage of clay recovered, the finished clay brightness and on the percentage of particles having a particle size less than 2 microns was investigated.

Washing was accomplished by re-suspending the kaolin flocs in water at approximately 10 percent solids, permitting the flocs to re-settle and withdrawing the wash water by siphon.

The results of the above were as follows:

| WASHINGS (No. of Times) | RECOVERED CLAY YIELD (%) | $TiO_2$ (%) | FINISHED CLAY (Brightness) | PARTICLES <2 MICRONS (%) |
|---|---|---|---|---|
| 0 | 77.0 | 0.87 | 89.5 | 91.1 |
| 1 | 75.1 | 0.75 | 89.8 | 91.0 |
| 2 | 73.2 | 0.71 | 90.0 | 90.9 |
| 3 | 72.0 | 0.68 | 90.2 | 90.8 |

Although specific preferred embodiments of the present invention have been described in the detailed description above, the description is not intended to limit the invention to the particular forms or embodiments disclosed herein, since they are to be recognized as illustrative rather than restrictive. It will be obvious to those skilled in the art that the invention is not so limited. The invention is declared to cover all changes and modifications of the specific example of the invention herein disclosed for purposes of illustration, which do not constitute departures from the spirit and scope of the invention.

I claim:

1. An improved method for beneficiating kaolin clay to remove titanium and iron impurities therefrom, said method consisting essentially of: treating an aqueous clay suspension by adding a dispersant selected from the group consisting of tetrasodium pyrophosphate, sodium tripolyphosphate, tetrasodium pyrophosphate and sodium hydroxide, and sodium tripolyphosphate and sodium hydroxide in an amount in excess of the amount required to obtain minimum viscosity but in an amount less than that amount which produces an intractable gel state; adding to said suspension from 0.5 to 1.5 pounds per ton of clay on a dry basis of a water soluble, strongly anionic polyacrylamide polymer having a molecular weight in excess of one million, whereby a separation of kaolin flocs is effected from said suspension at a sedimentation rate in excess of 10 minutes per inch of depth of said suspension; and washing and recovering said kaolin flocs.

2. The method in accordance with claim 1 wherein said clay flocs are subjected to high sheer mixing and to multiple washings.

3. The method in accordance with claim 2 wherein said clay flocs are redispersed and delaminated by grinding and shearing with glass beads of from 20 to 30 mesh size.

* * * * *